United States Patent [19]

Shepherd et al.

[11] Patent Number: 5,292,589
[45] Date of Patent: Mar. 8, 1994

[54] LAMINATES OF WHOLLY AROMATIC LIQUID CRYSTALLINE POLYMERS CONTAINING IONIC MONOMER UNITS

[75] Inventors: James P. Shepherd, Springfield, N.J.; Gerald Farrow, Charlotte, N.C.; Kurt F. Wissbrun, Summit, N.J.

[73] Assignee: Hoechst Celanese Corp., Somerville, N.J.

[21] Appl. No.: 968,708

[22] Filed: Oct. 30, 1992

Related U.S. Application Data

[62] Division of Ser. No. 854,148, Mar. 20, 1992, Pat. No. 5,227,456.

[51] Int. Cl.$^5$ ............................................. B32B 27/06
[52] U.S. Cl. ................................. 428/412; 428/423.4; 428/423.5; 428/423.7; 428/424.2; 428/425.5; 428/425.6; 428/425.8; 428/480; 428/483; 524/604; 524/605; 524/503
[58] Field of Search .................. 428/480, 483, 1, 412, 428/424.6, 423.4, 423.7, 424.2, 425.5, 425.8, 425.6, 411.1, 423.5; 528/171, 173, 180, 181, 190, 191, 194; 524/604, 605, 503

[56] References Cited

U.S. PATENT DOCUMENTS

| | | | |
|---|---|---|---|
| 4,161,470 | 7/1979 | Calundann | 260/40 P |
| 4,233,196 | 11/1980 | Sublett | 260/29.2 N |
| 4,540,737 | 9/1985 | Wissbrun et al. | 524/599 |
| 4,599,395 | 7/1986 | Dicke et al. | 528/173 |
| 4,863,767 | 9/1989 | Garg et al. | 428/1 |

Primary Examiner—P. C. Sluby
Attorney, Agent, or Firm—James L. McGinnis

[57] ABSTRACT

A melt processable wholly aromatic liquid crystalline polymer capable of forming an anisotropic melt phase at a temperature below approximately 400° C. having enhanced adhesion properties containing from approximately 0.05 to approximately 2.0 mole percent of a recurring sulfonated, ionic moiety in the backbone of the polymer. The polymer is useful for the production of laminate structures.

19 Claims, No Drawings

LAMINATES OF WHOLLY AROMATIC LIQUID CRYSTALLINE POLYMERS CONTAINING IONIC MONOMER UNITS

This is a divisional of copending application Ser. No. 07/854,148 filed on Mar. 20, 1992 is now U.S. Pat. No. 5,227,456.

FIELD OF INVENTION

The present invention relates to a wholly aromatic liquid crystalline polymer containing the residue of a sulfonated ionic monomer unit in the polymer backbone. The polymer exhibits enhanced adhesion properties and is useful for forming laminate materials.

BACKGROUND ART

Due to their availability and characteristics, wholly aromatic liquid crystalline polymers are desirably used in the formation of laminate articles. However, the use of these polymers therefor has been hindered by their poor adhesion properties to other laminate forming materials. The adhesion of glass, ceramic, polymeric and metallic layers to wholly aromatic liquid crystalline polymers has required the application of binders, heat and compression to the interfacial surfaces of the layers.

SUMMARY OF THE INVENTION

It has now been discovered that the addition of a small amount of a wholly aromatic ionic moiety to the backbone of wholly aromatic liquid crystalline polymers will improve the adhesion properties of the resulting polymers. The ionic moiety useful in the present invention is typically the residue of a wholly aromatic monomer having a metallic sulfonate group pendent thereto. The ionic moiety may be included in the backbone of wholly aromatic polyesters, aliphatic-aromatic polyesters, polycarbonates, poly(ester-carbonates), poly(ester-anides) and polyaramides to provide polymers exhibiting enhanced adhesion properties.

In accordance with the present invention there is described melt processable wholly aromatic liquid crystalline polymers capable of forming anisotropic melt phases at temperatures below approximately 400° C. having enhanced adhesion properties containing a small amount of recurring moieties of a sulfonated, ionic moiety into the backbone of the polymer.

The wholly aromatic liquid crystalline polymers of the present invention are useful for forming laminates which may include layers of ceramics, glasses, metals, other polymers and mixtures thereof. The invention finds particular use in the formation of laminate structures containing layers of metals and other polymers adhered to layers of the liquid crystalline polymers herein an intermediate application of an adhesive material is undesirable.

DETAILED DESCRIPTION OF THE INVENTION

It has now been discovered that the incorporation of a small amount of recurring moieties of a sulfonated, wholly aromatic, ionic moiety in the backbone of a melt processable liquid crystalline polymer will improve the adhesion characteristics of the polymer. Typically, the incorporation of approximately 0.05 to approximately 2.0 mole percent of at least one ionic moiety of the formulae:

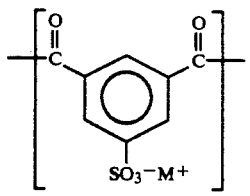

and

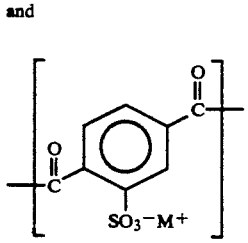

wherein M+ is a cation, in the backbone of a melt processable wholly aromatic polymer selected from the group consisting of wholly aromatic polyesters, aliphatic-aromatic polyesters, polycarbonates, poly(ester-carbonates), poly(ester-amides) and polyaramides will enhance the adhesion properties of the polymer. The cations useful in the ionic moiety are typically metals selected from the group consisting of sodium, potassium, lithium, zinc, calcium, cadmium, magnesium, barium and mixtures thereof. The linkage of the ionic moiety in the liquid crystalline polymer backbone may occur at the 1,3- or 1,4-positions of the ionic moiety unit with respect to the sulfonate group at the 5-position. Additional representative ionic moieties of this invention may be produced by substituting the sulfonates described hereinbefore onto ester-forming nuclei derived from hydroquinone, hydroxynaphthoic acids, hydroxybenzoic acids, substituted hydroxybenzoic acids, cycloalihatic dicarboxylic acids, etc.

Metals found to adhere particularly well to these polymers are selected from copper, silver, gold, tin, platinum, nickel, aluminum and alloys thereof. A variety of liquid crystalline, as well as tractable and intractable polymers, will readily adhere to the novel ionic moiety containing polymers described herein. When forming a laminate structure containing a plurality of liquid crystalline polymer layers, the incorporation of a small amount of recurring moieties of the ionic unit in the backbone of each polymer will provide excellent adhesion properties. Useful polymer layers of the present invention may include, but are not limited to, polyalkylene terephthalate, (e.g., polybutylene terephthalate and polyethylene terephthalate), polybenzimidazoles, polybenzimidazolones, polybenzoxazoles, polybenzthiozoles, nylons, polyvinylchlorides, wholly aromatic polyesters, polyarylates, polyamides, polyaramides, polyimides, poly(amide-imides), poly(ester-carbonates), poly(ester-amides) and the like.

The appropriate cation of the ionic moiety is dependent upon the material to be adhered to the liquid crystal polymer. If the desired material is a metal, the cation of the ionic moiety is typically selected from alkali metals, e.g., sodium, potassium and lithium. However, if the material is a polymer, the cation of the ionic moiety is typically selected from zinc, calcium, cadmium, magnesium and barium. When adhering metals to the melt processable wholly aromatic liquid crystalline polymers of the present invention, a preferred ionic moiety is of the formula:

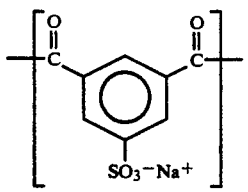

also known as 5-sodiosulfoisophthaloyl. When adhering polymer substrates to the liquid crystalline monomer of the present invention, a preferred ionic monomer is of the formula:

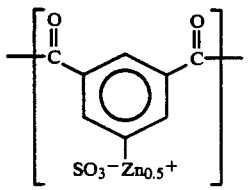

also known as 5-zincsulfoisophthaloyl.

One liquid crystal polymer of the present invention having enhanced adhesion properties and useful for forming laminate structures is a melt processable wholly aromatic liquid crystalline polyester capable of forming an anisotropic melt phase at a temperature of below about 350° C. containing recurring moieties of from approximately 10 to approximately 90 mole percent of 4-oxybenzoyl, from approximately 90 to approximately 10 mole percent of 6-oxy-2-naphthoyl, (the subject matter of U.S. Pat. No. 4,161,470 herein incorporated by reference in its entirety) and from approximately 0.05 to approximately 2.0 mole percent of the sulfonated, ionic moiety described hereinbefore. Typically, the polymer will contain recurring moieties of from approximately 65 to approximately 85 mole percent of 4-oxybenzoyl, e.g., approximately 75 mole percent, from approximately 15 to approximately 35 mole percent of 6-oxy-2-naphthoyl, e.g., approximately 25 mole percent, and from approximately 0.10 to approximately 1.75 mole percent of the sulfonated ionic moiety, e.g., approximately 1.0 mole percent, and exhibit an anisotropic melt processing temperature of below about 325° C. Preferably, however, the polymer will contain recurring moieties of approximately 73 mole percent of 4-oxybenzoyl, approximately 27 mole percent of 6-oxy-2naphthoyl and approximately 1.0 mole percent of the sulfonated ionic moiety, e.g., 5-sodiosulfoisophthaloyl or 5-zincsulfoisophthaloyl and exhibit a melt processing temperature of below about 300° C.

Another polymer of the present invention is a polyester capable of forming an anisotropic melt phase at a temperature below about 400° C., containing recurring moieties of from approximately 3 to approximately 10 mole percent of 6-oxy-2-naphthoyl, approximately 20 to approximately 70 mole percent of 4-oxybenzoyl, approximately 7.5 to approximately 38.5 mole percent of terephthoyl, approximately 7.5 to approximately 38.5 mole percent of 4,4'-dioxydiphenyl moiety (the subject matter of U.S. Pat. No. 4,473,682 herein incorporated by reference in its entirety) and approximately 0.05 to approximately 2.0 mole percent of at least one of the sulfonated, ionic moieties described hereinbefore. Still another melt processable wholly aromatic polyester of the invention capable of forming an anisotropic melt phase at a temperature below about 320° C. contains recurring moieties of from approximately 20 to approximately 40 mole percent of 6-oxy-2-naphthoyl, approximately 10 to approximately 50 mole percent of 4-oxybenzoyl, approximately 5 to approximately 30 mole percent of the residue of hydroquinone, approximately 5 to approximately 30 mole percent of terephthoyl, (the subject matter of U.S. Pat. No. 4,219,461 herein incorporated by reference in its entirety) and approximately 0.05 to approximately 2.0 mole percent of the sulfonated, ionic moiety described hereinbefore. Yet another polymer of the invention is a copolyester capable of forming an anisotropic melt phase at a temperature below about 340° C., containing recurring moieties of from approximately 33.3 mole percent of p-hydroxybenzoyl, approximately 33.3 mole percent of residue of hydroquinone, approximately 33.3 mole percent of isophthaloyl, (the subject matter of U.S. Pat. No. 3,637,595 herein incorporated by reference in its entirety), and approximately 0.05 to about 2.0 mole percent of the sulfonated, ionic moiety described hereinbefore.

The laminate structures of the present invention are generally constructed of at least first and second layers although a laminate containing multiple layers, i.e., three or more layers, is contemplated by the invention. The first layer is generally formed of the novel ionic monomer containing polymer described herein, and the second or third layer is formed of a glass, ceramic, metallic, polymeric component or mixtures thereof. Typically, the structure can contain alternating layers of the polymers of the present invention when three or more layers are included in the laminate. While the application of a binding agent to the interfacial surfaces of the layers followed by heating and compressing will promote adhesion, the laminate can be formed by compressing the layers at an elevated temperature for sufficient time to promote adhesion without the use of a binding agent.

These wholly aromatic liquid crystalline polymers will commonly exhibit weight average molecular weights of approximately 2,000 to 220,000, and preferably approximately 10,000 to 75,000, e.g. approximately 20,000 to 50,000. Such molecular weights are generally measured by end group determination via infrared spectroscopy on compression molded films. Alternatively, light scattering techniques on polymers dissolved in a one to one volume concentration of hexafluoroisopropanol-pentafluorophenol (HFIPPFP) solution may be employed to determine the molecular weight.

The ionic unit containing polymers of the present invention may be formed by a variety of techniques whereby organic monomer compounds possessing functional group which upon condensation form the requisite recurring moieties are reacted. Typical methods of forming liquid crystalline polymers of the present invention are described U.S. Pat. Nos. 3,316,326; 3,890,256; 4,067,852; 4,219,461; 4,473,682; and 5,015,722 herein incorporated by reference in their entirety.

The polymers described herein be considered crystalline in the sense that fibers melt extruded therefrom exhibit X-ray diffraction patterns using Ni-filtered CuK$\alpha$ radiation and flat plate cameras characteristic of polymeric crystalline materials. In spite of the crystallinity commonly observed, the wholly aromatic polymers of the present invention nevertheless may be easily melt processed in all instances.

The resulting polymer inherent viscosities (I.V.) were determined in a 1:1 V/V HFIP-PFP solution of 0.1 percent by weigh concentration at 60° C. according to the following equation:

$$I.V. = \ln(\eta rel)/c$$

where c concentration of solution (0.1 percent by weight), and $\eta rel$ = relative viscosity. The relative viscosity was measured by dividing the flow time in a capillary viscometer of the polymer solution by the flow time for the pure solvent. The polymer was subject to differential scanning calorimetry (DSC) at a 20° C./in heating rate to determine melt point temperature.

When forming fibers and films of the resent invention, the extrusion orifice ay be selected from among those commonly utilized during the melt extrusion of such shaped articles. For instance, the shaped extrusion orifice ay be in the form of a rectangular slit (i.e., a slit die) when forming a polymeric film. When forming a filamentary material, the spinneret selected nay contain one and preferably a plurality of extrusion orifices. For instance, a standard conical spinneret containing 1 to 2000 holes (e.g., 6 to 1500 holes) such as commonly used in the melt spinning of polyethylene terephthalate, having a diameter of approximately 1 to 70 mils (e.g., 5 to 40 mils) may be utilized. Yarns of approximately 20 to 200 continuous filaments are commonly formed. The melt-spinnable polyester is supplied to the extrusion orifice at a temperature above its melting point (e.g., at a temperature of about 300° to 380° C.), and at a temperature of about 335° to 375° C. in a preferred embodiment. The polyester of the present invention exhibits a highly attractive balance between its melting and heat deflection temperatures (HDT). The heat deflection temperature ill varying dependent upon the actual composition of the polymer, particularly, 6-hydroxy-2-naphthoic acid content. It also depends on whether the polymer contains glass or other mineral fillers known in the art. Filling with glass will sometimes cause an increase in HDT for some materials, and little if any for others. The heat deflection temperature of a molded article ay be determined in accordance with the procedure of ASTM D648 wherein the deflection temperature under load at 264 psi is ascertained.

Subsequent to extrusion through the shaped orifice the resulting filamentary material or film is passed in the direction of its length through a solidification or quench zone wherein the molten filamentary material or film is transformed to a solid filamentary material or film. The resulting fibers commonly have denier per filament of approximately 1 to 50, and preferably a denier per filament of approximately 1 to 20.

The as-spun fibers of this invention may be subjected to heat treatment in an oven while relaxed or under mid restraint to provided high strength fibers useful for a variety of industrial applications such as plastic, rubber reinforcement, etc. In the heat-treating process, fiber samples, as skeins or on bobbins are usually heated in an oven having an inert atmosphere that is continuously purged by flow of inert gas through the oven to remove by-products from the vicinity of the fiber. Temperatures approaching the fusion point, but sufficiently below to prevent interfilament fusion, are employed. Preferably, maximum temperature is reached in a stepwise fashion. Thermal treatment time commonly ranges from a few minutes to several days. As the fiber is thermally treated, its melting temperature is increased.

Tenacity (breaking tenacity), elongation (breaking elongation), and initial modulus were obtained by breaking a single filament (Data reported are averages of 10 breaks). Single filaments were broken with a gauge length (distance between jaws) of 2 5 cm. (1.0 inch). The results on 3 or more filaments are averaged All samples were elongated at a constant rate of extension (20% elongation/minute for fibers having an elongation of under 8%) until the samples broke. The tenacity (grams/denier), elongation (percent) and initial modulus (grams/denier) as described in ASTM D3822 were obtained from the load-elongation curve and the measured denier.

The following examples are presented as illustrations of the claimed invention. It should be understood, however, that the invention is not limited to the specific details set forth in the examples.

EXAMPLE 1

To a 2 liter 3-neck "slim Jim" flask equipped with a Vigreaux column and condenser, nitrogen inlet, thermocouple and C-shaped 316 stainless steel stirrer were charged 4-hydroxybenzoic acid (4.38 moles), 6-hydroxy-2-naphthoic acid (1.62 moles), and 5-sodiosulfoisophthalic acid, sodium acid, sodium salt can function as an esterification catalyst no additional catalyst was necessary. The flask was immersed in a sand bath and provided with means to accurately control the temperature, and thoroughly purged of oxygen by evacuating and flushing with nitrogen three times before the addition of acetic anhydride (2.5% molar excess). The flask was then laced in a fluidized sand bath and heated according to a preprogrammed, time-temperature cycle while purging the contents of the flask with nitrogen as follows: to a temperature of 125° C. over a period of 50 minutes; to 140° C. over 40 minutes; to 150° C. over 20 minutes; to 200° C. over 45 minutes; to 210° C. over 5 minutes; to 220° C. over 6 minutes; to 275° C. over 50 minutes; to 310° C. over 70 minutes: to 335° C. over 25 minutes; to 350° C. over 15 minutes; and to 355° C. over 15 minutes. The time-temperature profile was designed to allow adequate time for acetylation of the monomers followed by oligomerization and finally polymerization. As the temperature of the flask increased, acetic acid began to distill over and was collected in a graduated cylinder. The flask was slowly evacuated (in 100 mbar increments). The reading of the torque indicator was noted at the beginning of this vacuum period. Under vacuum at 355° C. the viscosity of the reactants gradually increased indicating polymerization. When the increase in torque reached a predetermined level ($\Delta$torque$\approx$55 mV), the vacuum was released (nitrogen was purged into the system). The Vigreaux column and condenser, nitrogen inlet, thermocouple and stirrer were removed from the flask and the formed polymer was allowed to cool. Finally, the flask was broken and the polymer plug removed. The plug was cut into several pieces and ground into small particles. Upon characterization, the polymer exhibited an inherent viscosity, as measured in one to one concentration of 1:1 V/V HFIP-PFP, of 9.0 dl/g and a melting temperature of 371° C. measured by DSC.

EXAMPLES 2 THROUGH 5

Procedures similar to Example 1 were performed to produce polymers containing 0 mole %, 0.5 mole % and 2.0 mole % of the 5-sodiosulfoisophthaloyl unit. The polymer was melt extruded into a continuous filament of about 5 denier per filament. More specifically, the polymer melt while at a temperature of about 320° C. was extruded through a spinneret provided with a single hole jet having a diameter of 0.127 mm and a length of 0.178 mm. The extruded filament was quenched in ambient air (i.e., at 72° F. and 65 percent relatively humidity). The as-spun filament was taken up at a rate of 800 meters per minute.

The resulting as-spun wholly aromatic polyester fibers exhibited the average single filament properties after thermal treatment in a dry nitrogen flow at 300° C. for 8 hours as reported below:

Fiber Containing 0 mole percent of 5-Sodiosulfoisophthaloyl Unit
Melting Point: 286° C.
Melt Viscosity @ 300° C.: 526 @ $10^3$ sec$^{-1}$
Inherent Viscosity: 7 dl/gm
As-Spun Tenacity: 11 gm/d
As-Spun Elongation: 2.5%
As-Spun Modulus: 520 gm/d
Heat-Treated Tenacity: 28 gm/d
Heat-Treated Elongation: 5%
Heat-Treated Modulus: 530 gm/d Fiber Containing 0.5 mole percent of 5-Sodiosulfoisophthaloyl Unit
Melting Point: 269° C.
Melt Viscosity @ 300° C.: 801 @ $10^3$ sec$^{-1}$
Inherent Viscosity: 6.2 dl/gm
As-Spun Tenacity: 6.1 gm/d
As-Spun Elongation: 1.5%
As-Spun Modulus: 464 gm/d
Heat-Treated Tenacity: 11 gm/d
Heat-Treated Elongation: 2.4%
Heat-Treated Modulus: 590 gm/d Fiber Containing 1.0 mole percent of 5-Sodiosulfiosophthaloyl Unit
Melting Point: 264° C.
Melt Viscosity @ 300° C.: 778 @ $10^3$ sec$^{-1}$
Inherent Viscosity: 6.19 dl/gm
As-Spun Tenacity: 5.5 m/d
As-Spun Elongation: 1.4%
As-Spun Modulus: 471 gm/d
Heat-Treated Tenacity: 7.1 gm/d
Heat-Treated Elongation: 1.8%
Heat-Treated Modulus: 415 gm/d Fiber Containing 2.0 mole percent of 5-Sodiosulfoisophthaloyl Unit
Melting Point: 265° C.
Melt Viscosity @ 300° C.: 898 @ $10^3$Sec$^{-1}$
Inherent Viscosity: *
As-Spun Tenacity: *
As-Spun Elongation: *
As-Spun Modulus: *
Heat-Treated Tenacity: *
Heat-Treated Elongation: *
Heat-Treated Modulus: *
no data, material could not be spun

EXAMPLES 6 AND 7

As a measure of the adhesive strength of the polyesters with and without the 5-sodiosulfoisophthaloyl unit, films were produced from polyester compositions of Formulation #1 and Formulation #2 as follows:

Formulation #1: 4-hydroxybenzoic acid (4.38 moles) and 6-hydroxy-2-naphthoic acid (1.62 moles); and
Formulation #2: 4-hydroxybenzoic acid (4.38 moles), 6-hydroxy-2-naphthoic acid (1.62 moles), and 5-sodiosulfoisophthalic acid, sodium salt (0.06 moles or 1.0 wt%).

Films of Formulations #1 (containing no sulfonated, ionic unit) and #2 (containing 1.0 wt% of sulfonated, ionic unit) were individually sandwiched between 0.0625 inch aluminum foil and Kapton film sheets, and a 0.0625 inch sheet of anodized aluminum alloy was placed onto the Kapton sheet. Kapton film was placed between the polymer film and the anodized aluminum alloy sheet to initiate adhesive failure. The laminates were compression molded at 295° C. and 25 psi for 25 minutes.

Adhesion strengths, i.e., roller peel strengths, were determined by the floating roller peel strength method, ASTM D3167-76(1986). Two samples, 5 inch wide specimens were tested from each composite; peel strengths were averaged over a 3 inch length. Results of adhesion tests of several of the samples are presented below for comparison:

| Sample | Peel Strength, lb/in |
|---|---|
| Formulation #1 | 3.75 |
| Formulation #1 | 3.12 |
| Formulation #2 | 11.50 |
| Formulation #2 | 9.57 |

The polyesters of Formulation #2 containing the 5-sodiosulfoisophthaloyl unit, showed significantly enhanced adhesion to aluminum foil over the polyesters of Formulation #1 containing no ionic unit.

EXAMPLES 8 THROUGH 20

According to the procedure utilized in Example 1, additional wholly aromatic liquid crystalline polymers containing 5-sodiosulfoisophthaloyl (SSI) units were produced. The formulations contained 4-hydroxybenzoic acid (HBA), 6-hydroxy-2-naphthoic acid (HNA), terephthalic acid (TA), isophthalic acid (IA), hydroquinone (HQ), paraaminobenzoic acid (PABA), 4,4'-dioxydiphenyl (BP), N-acetyl-p-aminophenol (AA), 2,6-dihydroxynaphthalene (DHN) and SSI. Rheological properties were measured b DSC at 20° C./min. heating rate for each of Formulations 3-15.

Formulation #3 contained a reaction mixture of:
60 mole % HBA,
5 mole % HNA,
16.5 mole % TA,
17.5 mole % BP, and
1 mole % SSI The resulting polymer had an inherent viscosity (IV) of 4.67 dl/g, and melt viscosities (MVs) of 1500 poise at a shear rate of $10^2$ sec$^{-1}$ and 539 poise at a shear rate of $10^3$ sec$^{-1}$ measured at 345° C. The polymer exhibited a crystallization temperature ($T_c$) of 241.4° C.

Formulation #4, a comparative example of Formulation #3, contained identical quantities of reactants but no SSI monomer.

Formulation #4 contained a reaction mixture of:
60 mole % HBA,
5 mole % HNA,
17.5 mole % TA,
17.5 mole % BP, and
0 mole % SSI The resulting polymer has an IV of to 7.5 dl/g, and MVs of 900 poise at a shear rate of $10^2$ sec$^{-1}$ and 350 poise at a shear rate of $10^3$ sec$^{-1}$ measured at 345° C.

The polymer exhibited a melt endotherm peak ($T_m$) of to 347° C., and a $T_c$ of 295° C.

Formulation #5 contained a reaction mixture of:
60 mole % HBA,
5 mole % HNA,
17 mole % IA,
17 5 mole % HQ, and
0.5 mole % SSI The resulting polymer had an (IV) of 1.17 dl/g, and an MVs of 2214 poise at a shear rate of $10^2$ sec$^{-1}$ and 841 poise at a shear rate of $10^3$ sec$^{-1}$ measured at 300° C. The polymer exhibited a glass transition temperature ($T_g$) of 125.4° C.

Formulation #6 contained a reaction mixture of:
60 mole % HBA,
5 mole % HNA,
16.5 mole % IA,
17.5 mole % HQ, and
1 mole % SSI The resulting polymer had an IV of 1.45 dl/g, and MVs of 985 poise at a shear rate of $10^2$ sec$^{-1}$ and 523 poise at a shear rate of $10^3$ sec$^{-1}$ measured at 340° C. The polymer exhibited $T_g$ of 125.3° C.

Formulation #7 contained a reaction mixture of:
72 mole % HBA,
27 mole % HNA,
0.5 mole % HQ, and
0.5 mole % SSI The resulting polymer had an IV of 6.99 dl/g, and MVs of 4005 poise at a shear rate of $10^2$ sec$^{-1}$ and 1096 poise at a shear rate of $10^3$ sec$^{-1}$ measured at 300° C. The polymer exhibited a $T_m$ of 267.6° C. and a $T_c$ of 219.9° C.

Formulation #8 contained a reaction mixture of:
72 mole % HBA,
26 mole % HNA,
1 mole % HQ, and
1 mole % SSI The resulting polymer has an IV of 5.80 dl/g, and MVs of 2360 poise at a shear rate of $10^2$ sec$^{-1}$ and 710 poise at a shear rate of $10^3$ sec$^{-1}$ measured at 300° C. The polymer exhibited a $T_m$ of 270.9° C. and a $T_c$ of 221.2° C.

Formulation #9 contained a reaction mixture of:
72 mole % HBA,
27 mole % HA,
0.5 mole % HQ, and
0.5 mole % SSI The resulting polymer had an IV of 5.86 dl/g, and MVs of 3147 poise at a shear rate of $10^2$ sec$^{-1}$ and 900 poise at a shear rate of $10^3$ sec$^{-1}$ measured at 300° C. The polymer exhibited a $T_m$ of 265.1° C. and a $T_c$ of 218.5° C.

Formulation #10 contained a reaction mixture of:
72 mole % HBA,
26 mole % HNA,
1 mole % HQ, and
1 mole % SSI The resulting polymer has an IV of 5.41 dl/g, and MVs of 2237 poise at a shear rate of $10^2$ sec$^{-1}$ and 669 poise at a shear rate of $10^3$ sec$^{-1}$ measured at 300° C. The polymer exhibited a $T_m$ of 270.6° C. and a $T_c$ of 221.7° C.

Formulation #11 contained a reaction mixture of:
72 mole % HBA,
26 mole % HNA,
1 mole % AA, and
1 mole % SSI The resulting polymer had an IV of 5.30 dl/g, and MVs of 2186 poise at a shear rate of $10^2$ sec$^{-1}$ and 684 poise at a shear rate of $10^3$ sec$^{-1}$ measured at 300° C. The polymer exhibited a $T_m$ of 267.6° C. and a $T_c$ of 218.4° C.

Formulation #12 contained a reaction mixture of:
72 mole % HBA,
26 mole % HNA,
1 mole % AA, and
1 mole % SSI The resulting polymer has an IV of 5.05 dl/g, and MVs of 1940 poise at a shear rate of $10^2$ sec$^{-1}$ and 625 poise at a shear rate of $10^3$ sec$^{-1}$ measured at 300° C. The polymer exhibited a $T_m$ of 269.7° C. and a $T_c$ of 221.1° C.

Formulation #13 contained a reaction mixture of:
72 mole % HBA,
26 mole % HNA,
1 mole % PABA, and
1 mole % SSI The resulting polymer had an IV of 6.66 dl/g, and MVs of 3194 poise at a shear rate of $10^2$ sec$^{-1}$ and 980 poise at a shear rate of $10^3$ sec$^{-1}$ measured at 300° C. The polymer exhibited a $T_m$ of 275.5° C. and a $T_c$ of 224.9° C.

Formulation #14 contained a reaction mixture of:
72 mole % HBA,
26 mole % HNA,
1 mole % DHN, and
1 mole % SSI The resulting polymer has an IV of 4.49 dl/g, and MVs of 948 poise at a shear rate of $10^2$ sec$^{-1}$ and 381 poise at a shear rate of $10^3$ sec$^{-1}$ measured at 300° C. The polymer exhibited a $T_m$ of 267.7° C. and a $T_c$ of 220.1° C.

Formulation #15 contained a reaction mixture of:
72 mole % HBA,
26 mole % HNA,
1 mole % DHN, and
1 mole % SSI The resulting polymer had an IV of 4.95 dl/g, and MVs of 1437 poise at a shear rate of $10^2$ sec$^{-1}$ and 514 poise at a shear rate of $10^3$ sec$^{-1}$ measured at 300° C. The polymer exhibited a $T_m$ of 267.4° C. and a $t_c$ of 219.7° C.

We claim:

1. A laminate structure exhibiting improved adhesion properties comprising at least a first and a second layer, the first layer consisting of a melt processable wholly aromatic liquid crystalline polymer capable of forming an anisotropic melt phase at a temperature below about 400° C. and containing in the polymer backbone from approximately 0.05 to approximately 2.0 mole percent of at least one ionic recurring moiety selected from the formulae:

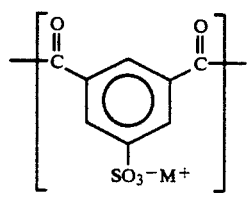

and

-continued

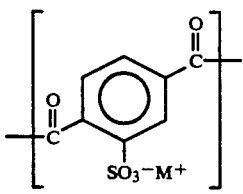

wherein M+ is a cation, said polymer backbone being a melt processable wholly aromatic polymer selected from the group consisting of wholly aromatic polyesters, polycarbonates, poly(ester-carbonates), poly(ester-amides) and polyaramides, and wherein the second layer is selected from the group consisting of metals, ceramics, glasses, polymers, and mixtures thereof.

2. The laminate according to claim 1 wherein the cation is selected from zinc, calcium, magnesium, barium, sodium, potassium, and lithium.

3. The laminate according to claim 1 wherein the ionic moiety is of the formula:

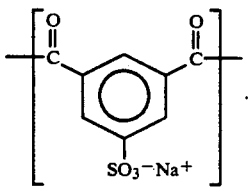

4. The laminate according to claim 3 wherein in the ionic moiety is present in a concentration of approximately 1.0 mole percent.

5. The laminate according to claim 3 wherein the second layer is a metal selected from the group consisting of silver, copper, gold, aluminum, platinum and alloys thereof.

6. The laminate according to claim 5 wherein the second layer is aluminum.

7. The laminate according to claim 1 wherein the second layer is a polymer selected from the group consisting of polyalkylene terephthalates, polybenzimidazoles, polybenzimidazolones, polybenzoxazoles, polybenzthiozoles, nylons, polyvinylchlorides, wholly aromatic polyesters, polyarylates, polyamides, polyaramides, polyimides, poly(amide-imides), poly(ester-carbonates) and poly(ester-amides).

8. The laminate according to claim 7 wherein the ionic moiety is of the formula:

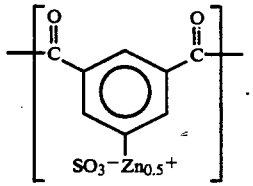

9. The laminate according to claim 7 wherein the ionic moiety is present in a concentration of approximately 1.0 mole percent.

10. The laminate according to claim 7 wherein the second layer is polyethylene terephthalate.

11. A laminate structure comprising at least a first and a second layer wherein said first layer consists of a liquid crystalline polyester capable of forming an anisotropic melt phase at a temperature below about 375° C. comprising recurring moieties of (a) from approximately 10 to to approximately 90 mole percent of 4-oxybenzoyl; (b) from approximately 90 to approximately 10 mole percent of 6-oxy-2-naphthoyl; and (c) from approximately 0.05 to approximately 2.0 mole percent of at least one recurring ionic moiety selected from the formulae:

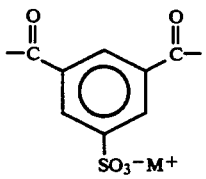

and

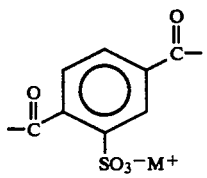

wherein M+ is a cation, and said second layer is selected from the group consisting of metals, ceramics, glasses, polymers, and mixtures thereof.

12. A laminate structure which exhibits improved adhesion properties comprising a plurality of layers wherein at least a first layer consists of a melt processable wholly aromatic liquid crystalline polymer capable of forming an anisotropic melt phase at a temperature below about 400° C. containing in the polymer backbone from approximately 0.05 to approximately 2.0 mole percent of at least one ionic recurring moiety selected from the formulae:

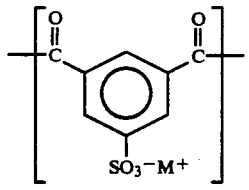

and

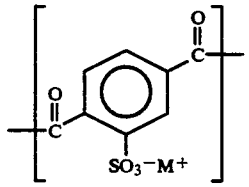

wherein M+ is a cation, said polymer backbone being selected from the group consisting of wholly aromatic polyesters, polycarbonates, poly(ester-carbonates), poly(ester-amides), and polyaramides, and wherein at least one second layer is selected from the group consisting of metals, ceramics, glasses, polymers, and mixtures thereof.

13. The laminate structure according to claim 12, wherein the cation is selected from zinc, calcium, magnesium, barium, sodium, potassium, and lithium.

14. The laminate structure according to claim 12, wherein at least one second layer comprises a metal.

15. The laminate structure according to claim 14, wherein the metal is selected from the group consisting of silver, copper, gold, aluminum, platinum and alloys thereof.

16. The laminate structure according to claim 15 wherein the the metal is aluminum.

17. The laminate structure according to claim 14 wherein the ionic moiety is of the formula:

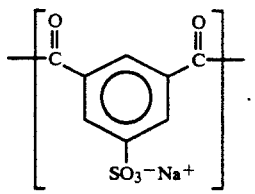

18. The laminate structure according to claim 17 wherein the ionic moiety is present in a concentration of approximately 1.0 mole percent.

19. The laminate structure according to claim 12 wherein the second layer is a polymer selected from the group consisting of polyethylene terephthalate, polybenzimidazoles, polybenzimidazolones, polybenzoxazoles, polybenzthiozoles, nylons, polyvinylchlorides, wholly aromatic polyesters, polyarylates, polyamides, polyaramides, polyimides, poly(amide-imides), poly(ester-carbonates) and poly(ester-amides).

* * * * *